United States Patent Office 2,761,755
Patented Sept. 4, 1956

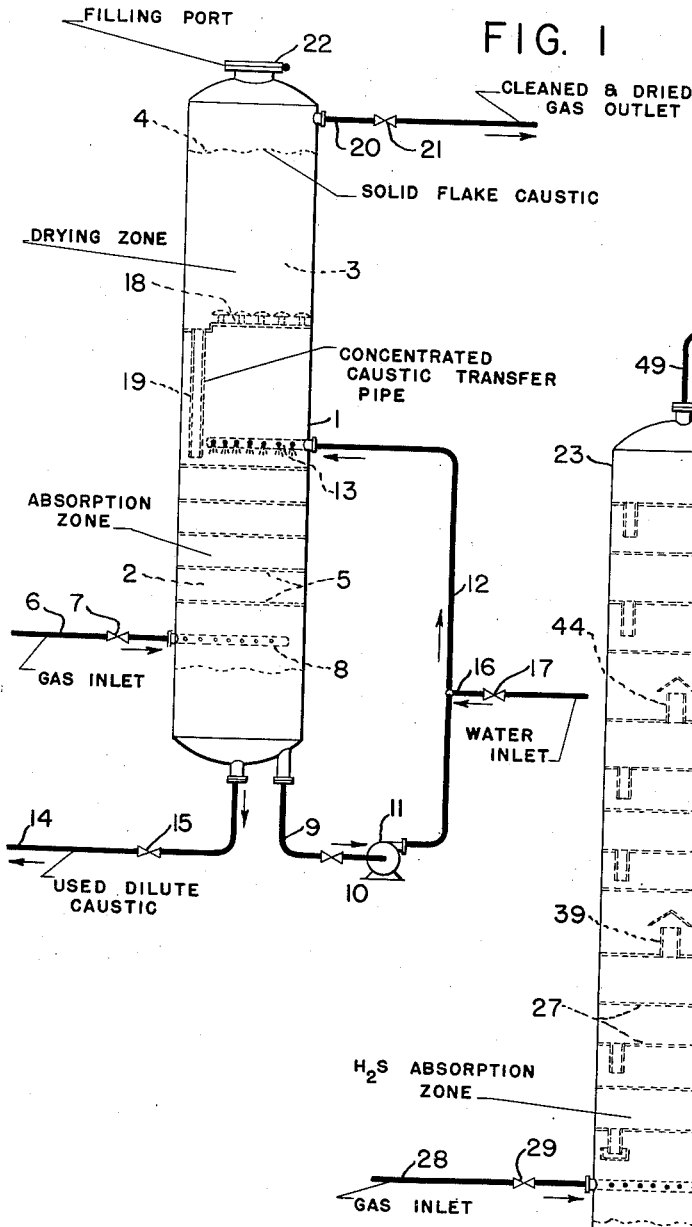
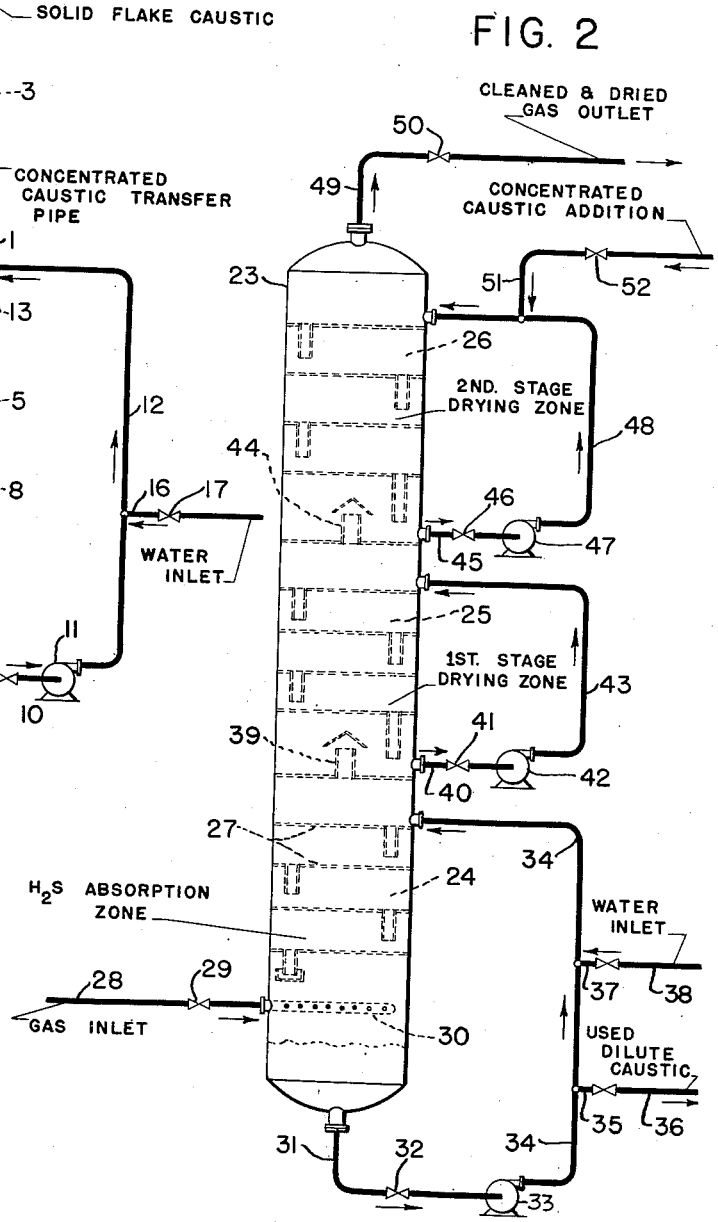

2,761,755

MEANS FOR REMOVING AN ACIDIC COMPONENT, PARTICULARLY HYDROGEN SULFIDE, AND WATER FROM FLUID STREAMS

Kenneth M. Brown, Hinsdale, Ill., assignor to Universal Oil Products Company, Chicago, Ill., a corporation of Delaware Application November 30, 1951, Serial No. 259,236

7 Claims. (Cl. 23—2)

This invention relates to method and means for removing an acidic component, such as hydrogen sulfide, carbon dioxide, mercaptans, etc., and water from fluid streams. More particularly, the invention is directed to an improved combination type of multiple stage operation utilizing an alkali metal hydroxide, such as caustic soda, for removing the undesired acidic component from a fluid stream and for effecting the drying thereof.

It is frequently desirable in connection with chemical and petroleum processing to effect the separation or removal of certain of these acidic components, i. e., removal of mercaptans to improve the quality of a resulting gasoline stream; removal of carbon dioxide from a hydrogen stream in a preliminary step to a hydrocarbon synthesis operation; and the hydrogen sulfide removal from hydrocarbon vapors, or from various gaseous streams. There are various present methods for treating streams with an alkali to remove hydrogen sulfide and mercaptans, including regenerative and non-regenerative operations. In general, where the hydrogen sulfide concentration is not too high it is economical to make expendable use of a relatively inexpensive material such as a dilute caustic solution rather than to use a more elaborate regenerating process and apparatus. However, a gas or liquid stream leaving an absorption zone will be saturated with water with respect to the dilute aqueous absorbent solution and it is often desirable to keep the amount of water in the stream to a low concentration. For example, in the hydrogen recycle gas stream of a catalytic gasoline or naphtha reforming operation there may be some hydrogen sulfide which it is desirable to remove prior to reintroducing the hydrogen stream into the catalytic reaction zone. It is also desirable in connection with the use of certain of the catalytic agents for reforming gasoline and naphtha fractions to maintain a substantially water free reaction zone. Thus, in a usual type of arrangement there must be some means for removing hydrogen sulfide from the gaseous hydrogen stream, as well as for drying the stream if it contains water or if water is introduced to it by the solution used to remove the H$_2$S. The water may be removed by using a desiccant or a water absorption process, prior to passing the hydrogen into the reaction zone.

It is, therefore, a principal object of the present invention to advantageously utilize an alkali metal hydroxide in a combination process for removing an acidic component and water from a fluid stream, in which spent dilute hydroxide may be discharged from the removal zone and replaced by partially diluted concentrated hydroxide recovered from the drying zone.

It is a further object of the present invention to provide a drying zone which maintains concentrated alkali, in either liquid or flake form, and which is superimposed over an absorption or removal zone so that resulting concentrated alkali with absorbed water can be collected and passed in a gravity flow to the lower removal zone.

In a broad aspect, the present invention provides a method for removing acidic components and water from a fluid stream containing the same, in a manner which comprises, passing the stream into contact with a dilute aqueous alkali metal hydroxide solution in a first absorption zone, passing the contacted stream substantially reduced in said acidic components into a second absorption zone and contacting the stream with concentrated alkali metal hydroxide to effect the drying thereof, withdrawing spent dilute aqueous metal hydroxide from the first absorption zone and replacing it with a portion of the resulting substantially concentrated aqueous alkaline metal hydroxide from the second absorption zone and added water, adding concentrated alkali metal hydroxide to the second absorption zone to replace that withdrawn therefrom, and discharging a resulting dried fluid stream free of acidic components from the second absorption zone.

In a more specific aspect, the present invention provides a method for continuously removing hydrogen sulfide and water from a gaseous stream in a manner which comprises, passing the stream into contact with a dilute aqueous caustic solution in a first absorption zone, passing the contacted gas substantially free of hydrogen sulfide into a second absorption zone or drying zone and therein contacting a concentrated caustic medium to effect the drying of the stream, withdrawing spent dilute caustic from the first absorption zone and replacing it with a portion of resulting partially diluted concentrated caustic from the second absorption zone and added water, adding concentrated caustic to the second absorption zone to replace that withdrawn therefrom, and discharging a dried and hydrogen sulfide free gaseous stream from the second absorption zone.

The concentrated alkali may be in liquid form, or in flake or granular form, within the water absorption zone of the present process. For example, where a solid flake or granular sodium hydroxide is used in the drying zone, the solid material may be placed in a bed supported by a suitable deck or perforate plate which permits passing a stream upwardly therethrough in a substantially uniform manner. Thus, as the water vapor from a gaseous stream contacts the particles, it is absorbed and there is a gradual formation and accumulation of concentrated caustic solution within the lower portion of the drying zone. A conduit or suitable transfer means is provided for continuously passing this concentrated solution into the removal zone in order to replace the spent dilute caustic removed from that zone. Spent dilute caustic is either periodically or continuously withdrawn from the absorption zone, as for example, where the hydrogen sulfide concentration builds up in the solution, and as set forth, the latter is continuously replaced by the passage of concentrated solution from the drying zone, and the addition of water as may be necessary to provide a suitable dilute solution.

It is to be noted, that a dilute aqueous solution is necessary to remove hydrogen sulfide, carbon dioxide, etc., because the alkali salts of these materials will form crystals in concentrated alkali solutions. For this reason, the water must be removed in a separate contacting zone after the acidic components have been removed, in order to avoid the crystallization of the salts and a resulting plugging of the contacting apparatus. The dilute caustic solution, referred to in the present invention, should not be more than about a 25% sodium hydroxide solution. For example, sodium sulfide is soluble to the extent of about 18% in water. It is soluble to less than about 1% in a 45% sodium hydroxide solution. This is also generally true for sodium carbonate solutions.

Preferably, the apparatus arrangement for carrying out the present combined operation is such that the drying zone is superimposed directly over the removal zone within a single unitary chamber. Thus, as a concentrated aqueous alkali solution is formed and collected in the drying zone, from the solid material and absorbed water, it may be allowed to flow by gravity directly into the absorption zone. In the absorption zone there is preferably a countercurrent flow between the rising gaseous stream and the dilute caustic stream. Therefore, suitable means for pumping the dilute caustic from the lower portion of the absorption zone to the upper portion thereof is provided in a preferred arrangement. Various types of bubble trays, side-to-side pans, perforate plates or the like, or a suitable packing material, may be used within the absorption zone to aid in effecting an efficient countercurrent contacting between the streams.

In using a solid material, such as granular or flake caustic soda, it is of course necessary to periodically open the drying zone and add more of the caustic as it becomes liquefied and is passed into the absorption zone. In order to overcome the necessity of opening the drying zone in this type of operation, a modification is provided, within the scope of the present invention, which embodies the utilization of concentrated liquid caustic within the drying zone. Thus, as partially diluted concentrated caustic is withdrawn from the latter zone and is passed into the absorption zone, fresh concentrated caustic may be added to the system by merely pumping more of the material into the drying zone. It is also desirable in this modified arrangement to provide means for continuously circulating the liquid caustic solution through the drying zone in a counter flow to the stream which is to be dried. An overflow well or downspout means may be provided between the separate zones to accommodate the flow of concentrated caustic from the drying zone to the acidic component removal zone, so that in accordance with the present invention concentrated caustic is periodically or continuously passed into the absorption zone to replace dilute caustic being withdrawn therefrom.

The present combined operation may be better described and explained by reference to the accompanying drawing and the following description thereof. The description and explanation is directed to the use of caustic soda for removing $H_2S$ from a gaseous stream, however, the invention is not to be limited to this single treating operation.

Figure 1 of the drawing indicates diagrammatically a unitary chamber and method of operation which utilizes a solid or flake type of caustic in an upper drying zone.

Figure 2 of the drawing indicates diagrammatically a modified embodiment of the present invention which utilizes a liquid concentrated caustic soda in two superimposed drying zones, and dilute caustic within a lower hydrogen sulfide removal zone.

Referring now to Figure 1 of the drawing there is shown a vertically positioned chamber 1 having a lower hydrogen sulfide absorption zone 2 and an upper drying zone 3. The upper zone is adapted to maintain a bed of granular or flake caustic soda, the upper extremity of which is indicated by the numeral 4, while the lower absorption zone 2 has a plurality of decks or trays 5, so that suitable countercurrent contacting may be effected between a rising gaseous stream and a descending dilute caustic. The gas to be treated, such as for example a hydrogen stream having hydrogen sulfide therein, is introduced by way of line 6 and valve 7 into the chamber 1 and is uniformly distributed across the area of the chamber by a suitable perforate pipe or header means 8. The gas stream then passes upwardly through the plurality of trays 5 so that substantially all of the hydrogen sulfide is removed by contact with the dilute caustic flowing downwardly through the trays 5. The present embodiment provides a line 9, having valve 10, connecting with a circulating pump 11 so that the dilute caustic may be withdrawn from the lower portion of the chamber 1 and continuously circulated through the absorption zone 2. The pump 11 discharges through line 12 and a fluid distributing header 13 within the upper portion of the absorption zone so that the caustic solution is substantially uniformly passed downwardly through the contacting zone. A line 14 with valve 15 communicates with the lower portion of chamber 1, and the absorption zone 2, so that spent dilute caustic may be withdrawn as is necessary whereby to maintain a liquid medium suitable for absorbing the hydrogen sulfide. Means are also provided by line 16 and valve 17 for introducing water into line 12 and the absorption zone 2 so that as concentrated caustic is added to the zone a desired dilute caustic solution may be formed.

The present embodiment indicates the bed of flake caustic 4 being supported on a suitable perforate deck 18 at the lower end of the drying zone 3. The deck or tray 18 is provided with a suitable pipe or downspout means 19, so that as liquid concentrated caustic soda is collected within the lower portion of the drying zone 3, it may be allowed to flow downwardly to the upper portion of the absorption zone 2. In operation, the gaseous stream leaves the upper portion of the absorption zone substantially free of hydrogen sulfide and passes directly through tray 18 and through the bed of solid caustic soda 4 to the upper portion of the chamber 1, whereby a resulting dried stream can be discharged by way of line 20 and valve 21. The upper portion of chamber 1 is provided with a suitable caustic filling door or port 22, so that additional solid caustic may be periodically introduced into the chamber to replace that which becomes liquefied.

Referring now to the modified embodiment of Figure 2 of the drawing, there is shown an elongated vertically disposed chamber 23 which has a lower hydrogen sulfide absorption zone 24, an intermediate first stage drying zone 25 and an upper second stage drying zone 26. Each of these zones has a plurality of decks or trays 27, which provide a desired countercurrent contact between a rising gaseous stream and a descending liquid stream. The gas stream to be purified and dried enters the lower portion of the chamber 23 by way of line 28, valve 29 and a suitable perforate pipe or distributing header 30, so that gas may be uniformly distributed into the lower portion of the hydrogen sulfide removal zone 24. In the lower zone 24, a dilute caustic soda solution is maintained for absorbing hydrogen sulfide from the gas, and in accordance with a preferable operation, this dilute solution is continuously circulated from the lower portion of the zone to the upper portion thereof by means of withdrawal line 31, valve 32, pump 33, and line 34 which discharges the liquid stream onto the uppermost deck or tray of that zone. Thus, there is a constant recirculation of the dilute caustic and a countercurrent contacting between the latter and the rising gaseous stream. A line 35 and valve 36 communicating with line 34 provides means for either periodically or continuously withdrawing used dilute caustic from the absorption zone. A line 37, having valve 38, also connecting with line 34, provides means for introducing water into the lower absorption zone, as may become necessary to further dilute the aqueous solution upon receiving a more concentrated caustic solution from the superimposed drying zones.

The gaseous stream substantially free of hydrogen sulfide passes from the upper portion of the absorption zone 24 through a well 39 and into the lower portion of the first stage drying zone 25. In this zone, the gaseous stream passes upwardly countercurrently to a caustic solution which is more concentrated than that in the lower absorption zone so that water vapor may be absorbed and removed from the gaseous stream. A withdrawal line 40, having valve 41, connects with the lower portion of the drying zone 25, at the zone of the well 39, so that the caustic solution from this zone may be continuously circulated by way of pump 42 and line 43 to the upper portion of the zone for downward flow over the plurality of decks or trays therein.

A partially dried and substantially $H_2S$ free gaseous stream leaves the upper portion of the intermediate zone 25 by way of a well 44 in order to enter the lower portion of the upper and second stage drying zone 26, whereby to contact a stream of highly concentrated caustic solution. Here again, the caustic solution which is maintained in this upper zone is circulated therethrough by means of withdrawal line 45 having valve 46 and pump 47 which discharges through line 48 into the upper portion of the zone. A substantially H₂S free and water-free gaseous stream is discharged from the upper end of the chamber 23 by way of outlet line 49 and valve 50.

In accordance with the present invention, a concentrated sodium hydroxide solution is utilized in the drying zones and in this embodiment concentrated caustic is added to the upper second stage drying zone by means of line 51, having valve 52, which connects with line 48. This concentrated caustic flows downwardly over the plurality of decks or trays 27 countercurrently to the gaseous stream and effects the substantially complete drying thereof by the absorption of any water vapor that may reach this upper zone. The addition of the concentrated caustic may be either periodic or continuous, however, as the volume of liquid builds up in this upper zone there is an overflow of concentrated caustic down through the well 44 to the upper portion of the intermediate zone 25. In this latter zone, water vapor is absorbed from the gaseous stream as the caustic passes downwardly countercurrently to the gas and there results a caustic stream which is somewhat more dilute than that in the upper zone. As caustic enters the intermediate zone from the upper zone, there is an overflow of the resulting somewhat more dilute caustic from the lower portion of the intermediate zone 25 through the well 39. Thus, caustic enters the upper portion of the H₂S absorption zone and is available to replace the dilute caustic of this zone, which becomes heavily concentrated with hydrogen sulfide and is withdrawn as necessary.

The embodiment of Figure 2 is of advantage over that of Figure 1, in that concentrated caustic soda may be continuously added without the necessity of shutting down the unit and adding caustic through a particular manhole or filling port. In other words, there is provided a unitary type of process and apparatus which may be operated continuously by adding the concentrated caustic through a pipe line and removing spent caustic through a suitable withdrawal line as may be necessary to effect the proper absorption and removal of hydrogen sulfide in the charge stream.

It is of course not intended to limit the present operation to the use of but one hydrogen sulfide absorption zone, or the integrated drying step to any predetermined number of contacting zones, for obviously one or more stages may be utilized for effecting both H₂S and water removal. It should also be noted that a suitable packing material, such as Raschig rings, may be utilized in lieu of the perforate plates or contacting decks which are indicated in the drawing for effecting the desired countercurrent contacting of the gaseous and liquid streams. Further, the hydrogen sulfide removal zone may be within a chamber separate from that of the drying zone, however, in accordance with the preferred arrangement the two zones are superimposed and maintained within a unitary type of column or chamber such that there may be a gravity flow of the concentrated liquid to the lower zone.

I claim as my invention:

1. A process for the purification of a fluid stream containing an acidic component which comprises countercurrently contacting said stream in a first absorption zone and effecting intimate contact thereof with a dilute aqueous alkali metal hydroxide solution and removing substantially all of said acidic component from the fluid stream in said zone, passing the thus contacted stream substantially free of acidic component and containing water into a second absorption zone, drying the last-named stream in said second zone by contacting the same therein with a reagent of higher alkali metal hydroxide concentration than said solution, withdrawing spent dilute alkali metal hydroxide solution from said first zone and replacing it by supplying to the first zone concentrated alkali metal hydroxide solution from the second zone and added water from a source other than said second zone, and discharging from the second zone a fluid stream substantially free of acidic components and water.

2. The process of claim 1 further characterized in that said reagent in the second zone is solid caustic soda.

3. The process of claim 1 further characterized in that said reagent in the second zone is a concentrated caustic solution.

4. A process for the purification of a gaseous stream containing hydrogen sulfide which comprises countercurrently contacting said stream in a first absorption zone and effecting intimate contact thereof with a dilute aqueous caustic solution and removing substantially all of said hydrogen sulfide from said gaseous stream in said zone, passing the thus contacted stream substantially free of H₂S and containing water into a second absorption zone, drying the last-named stream in said second zone by contacting the same therein with a reagent of higher caustic concentration than said solution, withdrawing spent dilute caustic from said first zone and replacing it by supplying to the first zone concentrated caustic solution from the second zone and added water from a source other than said second zone, replacing the caustic thus removed from said second zone by introducing an additional quantity of said reagent to the second zone, and discharging from the second zone a gaseous stream substantially free of H₂S and water.

5. A process for the purification of a gaseous stream containing hydrogen sulfide which comprises countercurrently contacting said stream in a first absorption zone and effecting intimate contact thereof with a dilute aqueous caustic solution and removing substantially all of said hydrogen sulfide from said gaseous stream in said zone, passing the thus contacted stream substantially free of H₂S and containing water into a second absorption zone, drying the last-named stream in said second zone by passing the same through a bed of concentrated flake caustic, thereby forming concentrated liquid caustic in the second zone, withdrawing spent dilute caustic from said first zone and replacing it by supplying to the first zone concentrated liquid caustic formed in the second zone and added water from a source other than said second zone, and discharging from the second zone a gaseous stream substantially free of H₂S and water.

6. A process for the purification of a fluid stream containing an acidic component which comprises countercurrently contacting said stream in a first absorption zone and effecting intimate contact thereof with a dilute aqueuous alkali metal hydroxide solution and removing substantially all of the acidic component from the fluid stream in said zone, passing the thus contacted stream substantially free of said acidic component but containing water into a second absorption zone, drying the last-named stream in said second zone by contacting the same therein with a reagent of higher alkali metal hydroxide concentration than said solution, passing concentrated alkali metal hydroxide solution from said second zone into the upper portion of the first zone, removing dilute alkali metal hydroxide solution from the lower portion of the first zone and discharging a portion thereof from the process, adding water to another portion of said dilute solution and introducing the resultant mixture to the upper portion of said first zone.

7. A process for the purification of a gaseous stream containing hydrogen sulfide which comprises countercurrently contacting said stream in a first absorption zone and effecting intimate contact thereof with a dilute aqueous caustic solution and removing substantially all of the H₂S from the gaseous stream in said zone, passing the thus contacted stream substantially free of H₂S and containing water into a second absorption zone, drying the last-named stream in said second zone by contacting the same therein with a reagent of higher caustic concentration than said solution, passing concentrated caustic solution from said second zone into the upper portion of the first zone, removing dilute caustic from the lower portion of the first zone and discharging a portion thereof from the process, adding water to another portion of said dilute caustic and introducing the resultant mixture to the upper portion of said first zone.

References Cited in the file of this patent

UNITED STATES PATENTS

| | | |
|---|---|---|
| Re. 18,563 | Cooper | Aug. 9, 1932 |
| 1,389,980 | Ramsburg | Sept. 6, 1921 |
| 1,390,037 | Jacobson | Sept. 6, 1921 |
| 1,436,196 | Ramsburg | Nov. 21, 1922 |
| 1,519,932 | Reich | Dec. 16, 1924 |
| 1,861,268 | Gollmar | May 31, 1932 |
| 2,026,935 | Downs | Jan. 7, 1936 |
| 2,081,960 | Sperr | June 1, 1937 |
| 2,193,570 | Seaton | Mar. 12, 1940 |
| 2,225,959 | Miller | Dec. 24, 1940 |
| 2,235,322 | Martin | Mar. 18, 1941 |

FOREIGN PATENTS

| | | |
|---|---|---|
| 444,327 | Great Britain | Mar. 19, 1936 |
| 655,438 | Great Britain | July 18, 1951 |